(12) United States Patent
Broquist et al.

(10) Patent No.: US 6,944,668 B1
(45) Date of Patent: Sep. 13, 2005

(54) SYSTEM OPERABLE TO IDENTIFY AND ACCESS INFORMATION ABOUT A USER

(75) Inventors: Thomas Broquist, Stocksund (SE); Lars Eriksson, Tyresö (SE)

(73) Assignee: Targian AB, Stockholm (SE)

( * ) Notice: Subject to any disclaimer, the term of this patent is extended or adjusted under 35 U.S.C. 154(b) by 0 days.

(21) Appl. No.: 09/673,719

(22) PCT Filed: Apr. 3, 2000

(86) PCT No.: PCT/SE00/00641

§ 371 (c)(1),
(2), (4) Date: Oct. 20, 2000

(87) PCT Pub. No.: WO01/75558

PCT Pub. Date: Oct. 11, 2001

(51) Int. Cl.[7] .......................... G06F 15/16; G06F 17/60
(52) U.S. Cl. .......................... 709/229; 709/205; 705/26
(58) Field of Search ............................... 709/229, 203, 709/205; 705/26, 30, 34; 711/117, 118, 119, 711/126

(56) References Cited

U.S. PATENT DOCUMENTS

| | | | | |
|---|---|---|---|---|
| 6,012,100 A | * | 1/2000 | Frailong et al. | 709/250 |
| 6,148,405 A | * | 11/2000 | Liao et al. | 713/201 |
| 6,240,091 B1 | * | 5/2001 | Ginzboorg et al. | 370/401 |
| 6,256,739 B1 | * | 7/2001 | Skopp et al. | 713/201 |
| 6,308,203 B1 | * | 10/2001 | Itabashi et al. | 709/217 |
| 6,385,651 B2 | * | 5/2002 | Dancs et al. | 709/227 |
| 6,385,729 B1 | * | 5/2002 | DiGiorgio et al. | 713/201 |
| 6,442,687 B1 | * | 8/2002 | Savage | 713/156 |
| 6,487,584 B1 | * | 11/2002 | Bunney | 709/206 |
| 6,505,238 B1 | * | 1/2003 | Tran | 709/208 |
| 6,606,663 B1 | * | 8/2003 | Liao et al. | 709/229 |

OTHER PUBLICATIONS

Metz, Christopher. "AAA Protocols: Authentication, Authorization, and Accounting for the Internet" IEEE Internet Computing, Nov.-Dec. 1999.*

Park, Myung Ah et al. "Dial up Internet Access Service System with Automatic Billing Mechanism" International Conference on Information, Communications and Signal Processing. Singapore, Sep. 9-12, 1997.*

* cited by examiner

Primary Examiner—William A. Cuchlinski, Jr.
Assistant Examiner—Tam T. Phan
(74) Attorney, Agent, or Firm—Albihns Stockholm AB (57) ABSTRACT

The present invention relates to a system operable to identify and access information about a user (109) of a distributed communication system. The system comprises at least one service device (108), and at least one access device (105a) operable to provide access to said distributed communication system. The system also comprises at least one control means (101; 103) connected to said at least one access device (105a) and to said at least one service device (108), a to said at least one access device (105a) connected identification device (113) operable to identify an address of a specific user (109). The system also comprises at least one storage device (102; 104) connected to said at least one control means (101; 103), and a to said at least one control means (101; 103) connected cache means (111) operable to store mappings of said addresses and identifications for said users (109).

30 Claims, 8 Drawing Sheets

Fig. 8

SYSTEM OPERABLE TO IDENTIFY AND ACCESS INFORMATION ABOUT A USER

TECHNICAL FIELD OF THE INVENTION

The present invention relates in a first aspect to a system operable to identify and access information about a user of a distributed communication system.

In a second aspect the present invention relates to a method for identifying and accessing information about a user of a distributed communication system.

In a third aspect the present invention relates to at least one computer program product for identifying and accessing information about a user of a distributed communication system.

DESCRIPTION OF RELATED ART

During the last years the Internet has been the fastest growing media for communication and this expansion is expected to continue. One of the most common means to finance content and services in the Internet is by selling advertising space. In traditional media, advertising has been one of the primary sources of revenues and effort has always been focused on maximizing the results from advertising.

Internet is not different when it comes to optimizing advertising campaigns The goal for any party serving advertisement on the Internet is to be able to expose the correct advertisement to the Internet user in question. The problem with this is that it is relatively simple to be anonymous on the Internet and therefore it is normally only possible to prepare targeting of advertisement based on estimates given an Internet users previous visits on web-sites controlled by the advertisement serving party.

The technology to identity Internet users available today is based on the use of "cookies". A cookie is a data file stored at web-browser level. This technology has some serious disadvantages. First it is very easy for the Internet user to turn off the function to receive cookies. Second, it is the web-browser being identified, not the Internet user using the web-browser.

Today there is mainly one solution to the problem of identifying an Internet user. This solution is used today but has limitations. This solution is based on a process of log-in where the Internet user is identified by a user name and authenticated by a password. By using a log-in process it is possible to determine which individual is using the web-browser at a given point in time on the specific web-site on which the user has logged in.

If it was possible to easily and safely identify an Internet user without the need for cookies or log-in procedures, a whole range of new possibilities should appear, such as the possibility to subsidize and/or charge activities or time spent on a specific web-site, the possibility to charge micro-amounts, or handling log-in without the Internet user being involved etc.

SUMMARY

It is an object of the present invention to solve the above mentioned problems. The purpose of the invention is to be able to identify and access information about a user of a distributed communication system in real time without the users intervention whenever the user implicitly or explicitly requests a service from a service provider on e.g. the Internet.

According to the present invention there is provided in a first aspect a system operable to identify and access information about a user of a distributed communication system in real time without the users intervention. The system comprises at least one service device (108) operable to provide services to said user, and at least one access device operable to provide access to said distributed communication system. The system also comprises at least one control means connected to said at least one access device and to said at least one service device. The system also comprises said at least one access device connected identification device operable to identify an address of a specific user, and at least one storage device connected to said at least one control means. The system also comprises said at least one control means connected cache means operable to store mappings of said addresses and identifications of said users. The service device sends a request for information about a user requesting a service from said service device to said control means, which control means checks if said cache means contains an up to date identification. If said check gives an affirmative answer said control means fetches said information from said storage device and sends a reply comprising said information to said service device. On the other hand, if said check gives a negative answer said control means sends a request for a real time identification of said address to said access device, which access device identifies said address with the aid of said identification device and sends said identification to said control means, which control means fetches said information from said storage device, and sends a reply comprising said information to said service device. The main advantage with the system according to the present invention is that it makes it easy and safe to identify a user without the need for cookies or log-in procedures.

Another object of the invention is to provide a method for identifying and accessing information about a user of a distributed communication system in real time without the users intervention. the method is performed with the aid of a system comprising at least one service device operable to provide services to said user, and at least one access device operable to provide access to said distributed communication system. The method comprises the following steps:

requesting a service by a user (109) from a service device (108);

sending a request by said service device (108) for additional information about said user (109) to a control means (101; 103);

checking, by said control means (101,103), if a cache means (111) connected to said control means (101; 103) contains an up to date identification; whereby if said check gives an affirmative answer, said control means (101; 103) fetches said information from said control means (101; 103) connected to a storage device (102; 104) and sends a reply comprising said information to said service device (108); or if said check gives a negative answer, said control means (101, 103) sends a request for a real time identification of an address of said user (109) to said access device (105a);

identifying said address, by said access device (105a) with the aid of a connected identification device (113), wherein said access device sends said identification to said control means (101; 103); and fetching said information from said storage device (102; 104), and sending a reply comprising said information to said service device. The main advantage with the method according to the present invention is that it becomes easy and safe to identify a user without the need for cookies or log-in procedures.

Another object of the invention is to provide at least one computer program product directly loadable into the internal memory of at least one digital computer. The at least one computer program product comprises software code portions for performing the steps of the method according to the present invention, when said at least one product is/are run on said at least one computer. The main advantage with the computer program product(s) according to the present invention is that it becomes easy and safe to identify a user without the need for cookies or log-in procedures.

It should be emphasised that the term "comprises/comprising" when used in this specification is taken to specify the presence of stated features, steps or components but does not preclude the presence of one of more other features, integers, steps, components or groups thereof.

Embodiments of the invention will now be described with a reference to the accompanying drawings, in which:

DETAILED DESCRIPTION OF EMBODIMENTS

Figure 1:
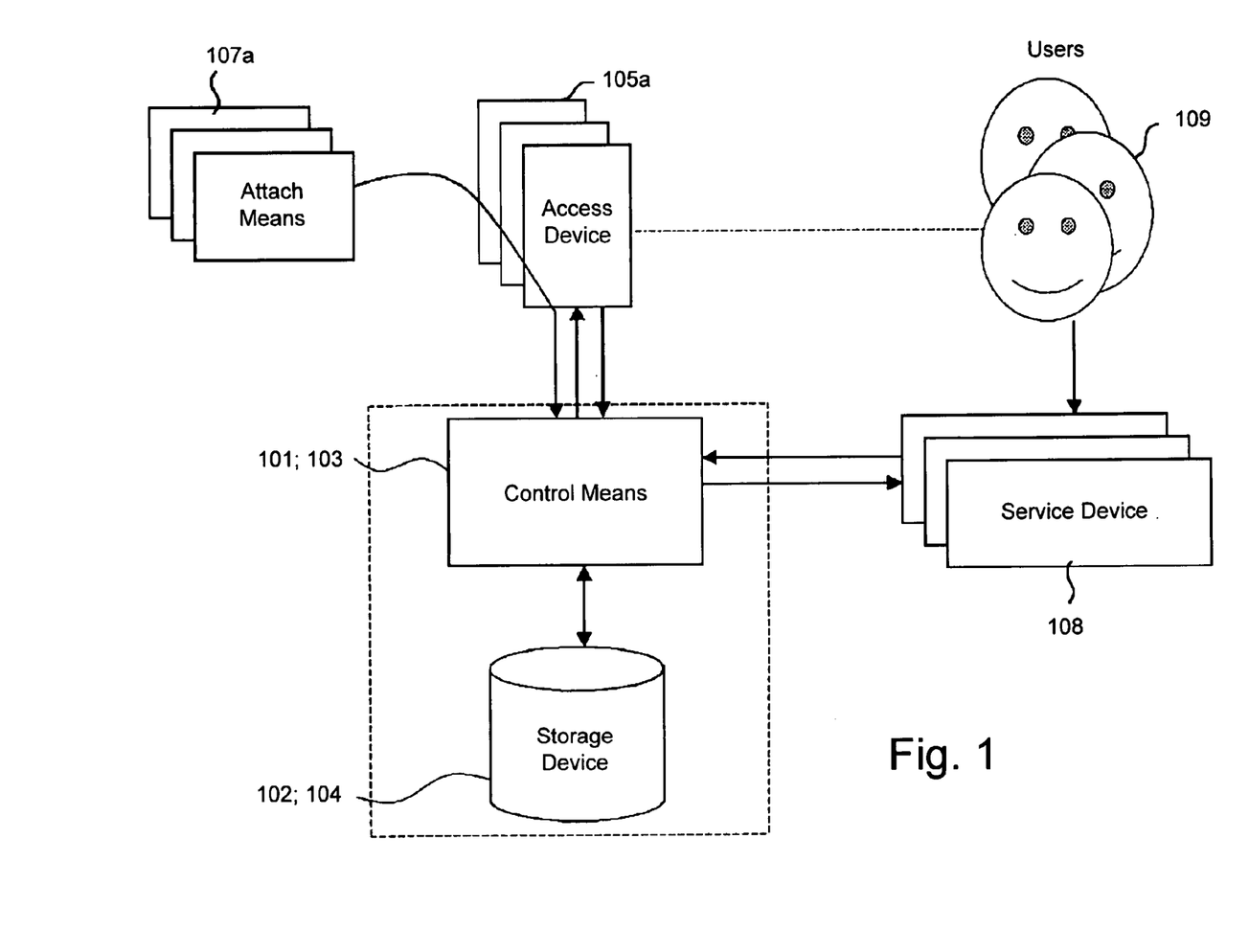
FIG. 1 shows a block diagram of a system operable to identify and access information about a user of a distributed communication system according to the present invention.

In FIG. 1 there is disclosed a block diagram of a system operable to identify and access information about a user of a distributed communication system according to the present invention. The distributed communication system can e.g. be the Internet, the Internet 2 or a digital TV-system, and comprises according to FIG. 1 three service devices 108 operable to provide services to different users, here disclosed at 109, in the form of three different users 109. The distributed communication system also comprises three access devices 105*a*, each operable to provide access to said distributed communication system. The system according to the present invention, limited by said broken line, comprises at least one control means 101; 103, here only one is disclosed, connected to said three access devices 105*a* and to said three service devices 108. The system according to the present invention also comprises at least one storage device 102; 104, here only one is disclosed, connected to said at least one control means 101; 103. The distributed communication system can also comprise at least one attach means 107*a*, here three are disclosed, each operable to attach additional information to identifications. If said distributed communication system is the Internet, said service device 108 is an online service provider, said access device 105*a* is an Internet access provider (IAP) 105*a*, and said attach means 107*a* is an additional supplier 107*a*. A service provider is in this context any party providing an Internet based service. Said control means 101; 103 is in this context a server 101; 103.

Figure 2:
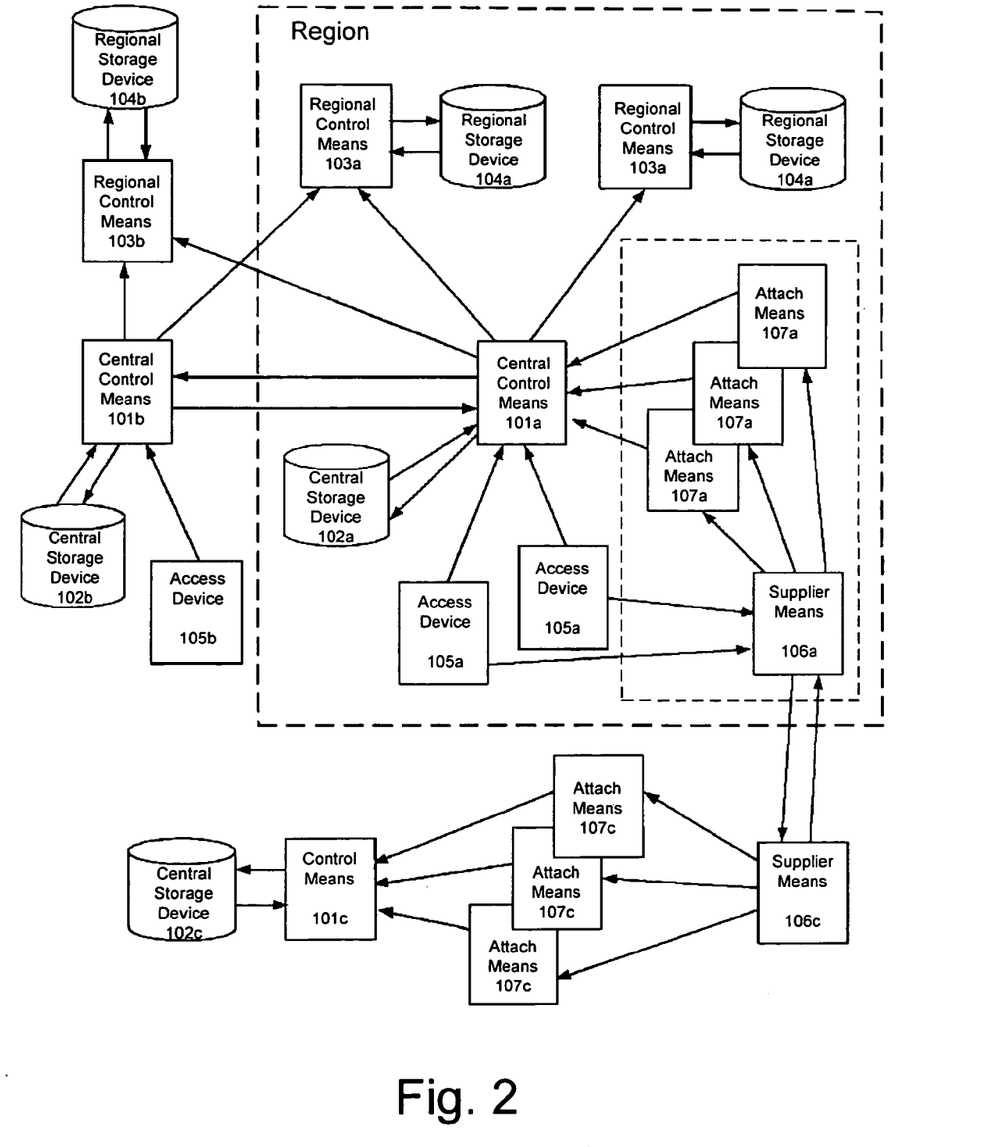
FIG. 2 shows another block diagram of the system in FIG. 1 in more detail.

In FIG. 2 there is disclosed another block diagram of the system disclosed in FIG. 1 in more detail. The aim with this figure is to illustrate that the system according to the present invention can be divided into a number of geographical regions. In FIG. 2 said system is divided into three different geographical regions. Said division is performed based on the distance between the individual control means 101; 103 in the system according to the present invention. In a fist region, encircled by the broken line, there is disclosed a central control means 101*a* connected to a central storage device 102*a*, two access devices 105*a* connected to said central control means 101*a*. In said first region there are also disclosed two regional control means 103*a* connected to said central control means 101*a*. Each said regional control means 103*a* is also connected to a regional storage device 104*a*. Each geographical region can also comprise a supplier means 106*a* for handling a number of attach means 107*a*. Each attach means 107*a* is connected to said supplier means 106*a* and to said central control means 101*a*. In this FIG. 2 there is also disclosed a second geographical region comprising a central control means 101*b*, a central storage device 102*b* connected to said central control means 101*b*. This region also comprises a regional control means 103*b* connected to said central control means 101*b*. At last, said second region also comprises a regional storage device 104*b* connected to said regional control means 103*b*. As is apparent from FIG. 2 this second region does not comprise any access device, supplier means or attach means. It is noted that there can be more than one region comprising the same parts as in the first region. In this FIG. 2 there is also disclosed a third geographical region comprising a central control means 101*c*, a central storage device 102*c* connected to said central control means 101*c*. This third region also comprises a supplier means 106*c* and three attach means 107*c*, wherein each attach means 107*c* is connected to said supplier means 106*c* and to said central control means 101*c*. Of course there are connections between said different regions. In FIG. 2 there is disclosed a connection between said central control means 101*a* and said central control means 101*b*. There is also a connection between said central control means 101*a* and said regional control means 103*b* and a connection between said central control means 101*b* and said regional control means 103*a*. There is also a connection between said supplier means 106*a* and said supplier means 106*c*. In connection with FIG. 6 there is described the function of the system disclosed in FIG. 2.

Figure 3:
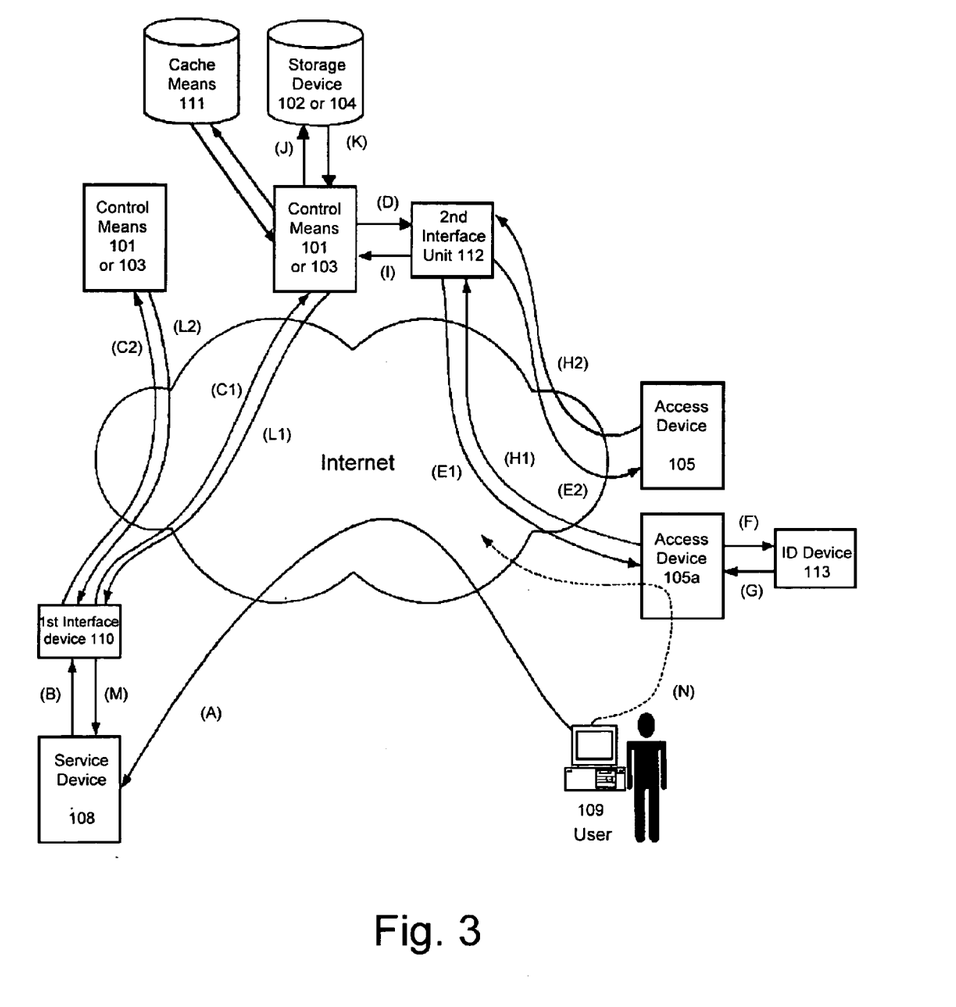
FIG. 3 shows yet another block diagram of said system in FIG. 1, when said system is used in connection with the Internet.

In FIG. 3 there is disclosed yet another block diagram of said system in FIG. 1, when said system is used in connection with the Internet. The same reference signs in the different figures represent the same structural elements and are not described again. The Internet is schematically shown in the middle of the figure in the form of a "cloud". The system also comprises a first interface unit 110 connected to said service device 108, which first interface unit 110 also is connected to two different control means 101; 103. The system also comprises a second interface unit 112 connected to said control means 101; 103 and to two access devices 105; 105*a*. Said control means 101; 103 are also connected to said storage device 102; 104. Said interface units can e.g. be Application programming Interfaces (API). The system also comprises a cache means 111 connected to said control means 101; 103, which cache means 111 is operable to store mappings of said addresses and identifications for said users 109. The system also comprises an identification device 113 operable to identify an address of a specific user 109. Said identification device 113 is connected to said access device 105a. Said identification device 113 is a device that finds a mapping between an address and an identifier for the user 109 currently using said address. This information may be extracted from a storage device connected to said access provider 105a, which the access provider 105a always updates with information on which address said access provider 105a assigns to said user 109. This storage device can e.g. be a database. In connection with FIG. 4 there is described the function of the system disclosed in FIG. 3.

Figure 4:
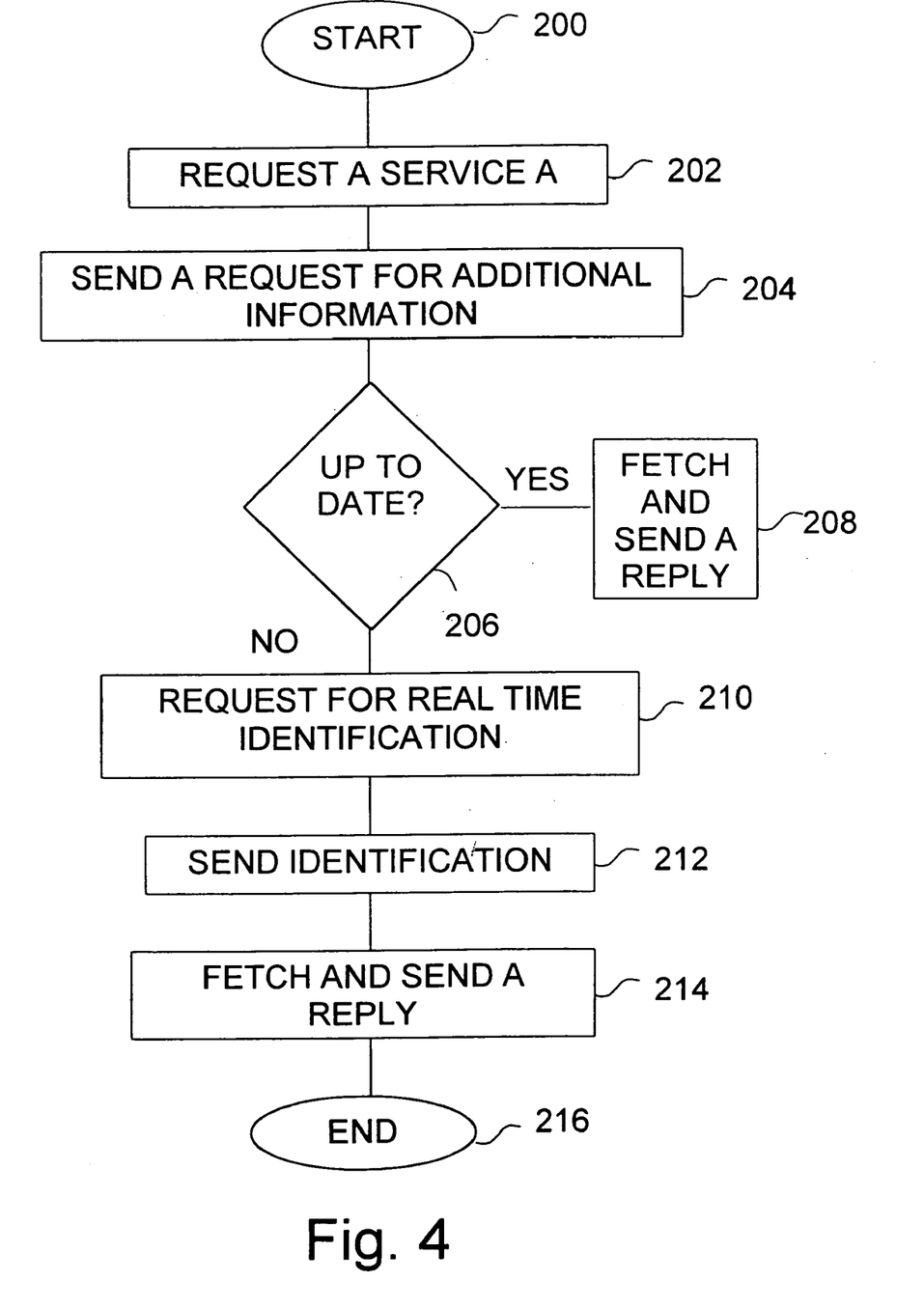
FIG. 4 is a flow chart of a method for identifying and accessing information about a user of a distributed communication system in real time according to the present invention.

In FIG. 4 there is disclosed a flow chart of a method for identifying and accessing information about a user of a distributed communication system in real time according to the present invention. The method is performed without the users 109 intervention. Said method is also performed with the aid of a system, e.g. disclosed in FIG. 3, comprising at least one service device 108 operable to provide services to said users 109, and at least one access device 105a operable to provide access to said distributed communication system. The method begins at block 200. At block 202 the method continues with the step: that a user 109 requests a service A (see e.g. FIG. 3), implicitly or explicitly from a server device 108. The method continues at block 204 with the step that said service device 108 sends a request B, C1 for additional information about said user 109 to a control means 101; 103. At block 206 the method continues with the step that said control means 101; 103 checks if said cache means 111 contains an up to date identification. If said check gives an affirmative answer the method continues at block 208 with the step that said control means 101; 103 fetches said information from said storage device 102; 104, and sends a reply comprising said information to said service device 108. Said information fetched by said control means 101; 103 is connected to said identification from said cache means 111. If said check gives a negative answer the method continues at block 210 with the step that said control means 101; 103 sends a request D, see e.g. FIG. 3, for a real time identification of said address of said user 109 to said access device 105a. At step 212 the method continues with the step that said access device 105a identifies said address with the aid of said identification device 113, and sends said identification to said control means 101; 103. The method continues, at block 214, with the step that said control means 101; 103 fetches said information from said storage device 102, 104, and sends a reply comprising said information to said service device 108. The method is completed at block 216.

The request B, see FIG. 3, contains the current IP-address assigned to the Internet user 109. The request B is forwarded by said first interface unit 110 to a request C1. The first interface unit 110 decides which server 101; 103 to send the request C1 to based on the geographical location of said server 101; 103 and the geographic location of said access means 105a said Internet user 109 is connected to. Said first interface unit 110 also decides whether to optimize this selection based on speed or reliability depending on the type of the request. The sec and interface unit 112 selects the correct access means 105a based on the IPaddress in the request C1 and forwards the request EI, still containing the IPaddress assigned to the Internet user 109, to the access means 105a. The access means 105a identifies the IP-address in request EI by the use of said identification device 113, and sends an identification back to said server 101; 103. This is illustrated in FIG. 3 with H1 and I. Said server 101; 103 updates said cache means 111 with the mapping between the IP-address in request C1 and the identification delivered from the access means 105a. The server 101; 103 fetches information connected to the identification delivered from said access means 105a from said storage device 102; 104, and sends a reply to said service device 108. This is illustrated in FIG. 3 with L1 and M. The server 101; 103 finally logs the request.

Figure 5:
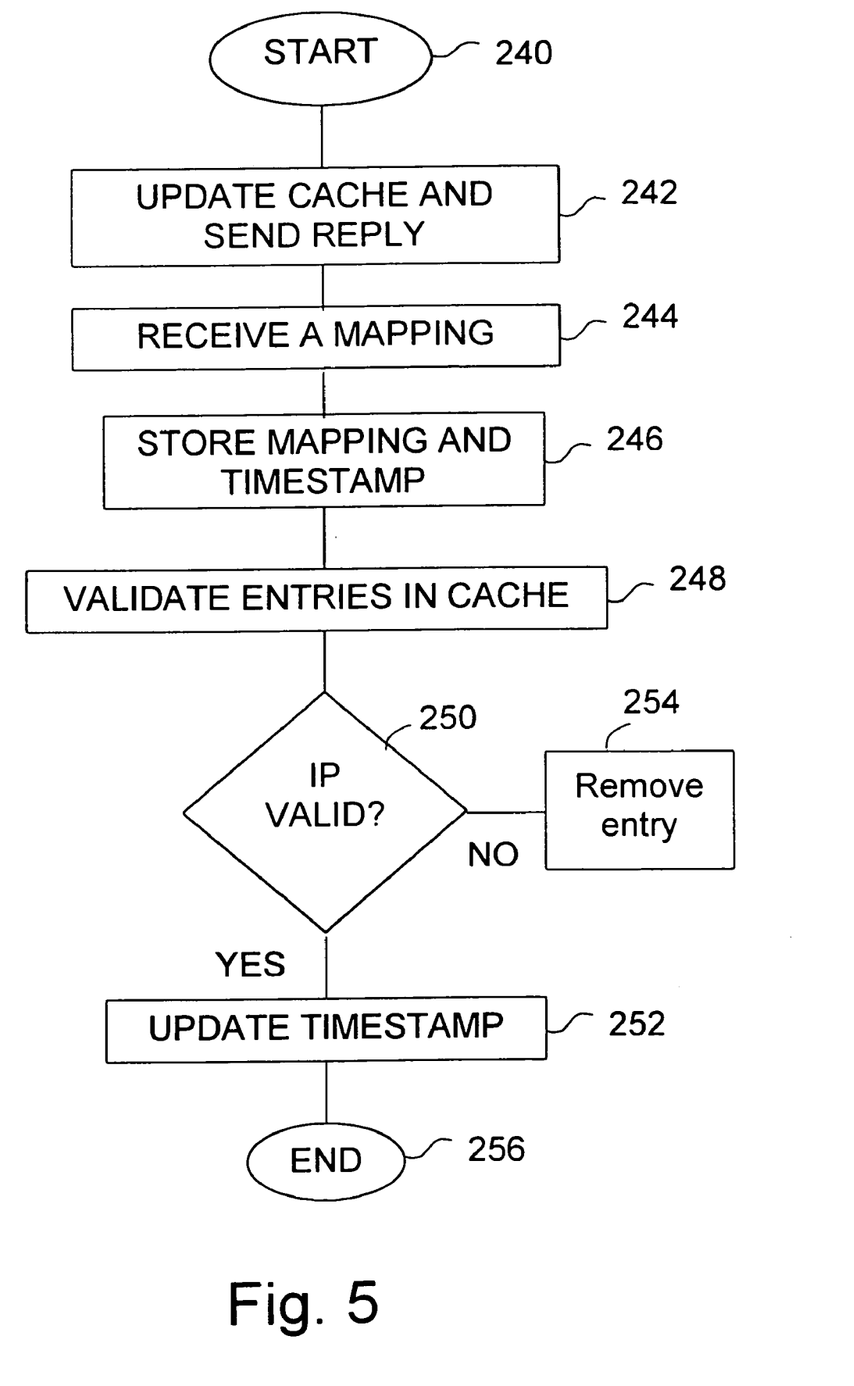
FIG. 5 is a flow chart of a method for updating of an internal cache means according to the present invention.

In FIG. 5 there is disclosed a flow chart of a method for updating of an internal cache means according to the present invention. The method begins at block 240. At block 242 the method continues with the step that said server 101; 103 updates said cache means 111 with the mapping between said IP-address and said identification for each request C1, and sends a reply (H1 and I) in correspondence thereto. The method continues at block 244 with the step that said server 101; 103 receives a mapping between an IP-address and an identification by querying said access means 105a, or directly from another server 101; 103 when the other server 101; 103 has received a mapping according to step 242. The next step, at block 246, consists of storing said mapping in an internal cache means 111 together with a timestamp. This step is performed by said server 101; 103. At block 248 said method continues with the step that the server 101; 103 iterates through the currently stored mappings between a IP address and an identification in said cache means 111, and validates the entries if a certain time has elapsed since the entry was last validated according to the stored timestamp. The validation is performed by querying said access means 105a for an identification of the IP-address. At block 250 the question is asked if the IP-address is valid? An entity in said cache means 111 is valid if the access device 105a which "is the owner" of the address can verify that the identity still is associated with said address, by the use of said identification device 113. If the answer is affirmative the timestamp on said entry is updated as in block 252. On the contrary, if the answer is negative, i.e. the IP-address is invalid, the cache entry is removed as in block 254. The method is completed at block 256. It is noted that the steps according to this FIG. 5 is a part of the methods according to the present invention.

Figure 6:
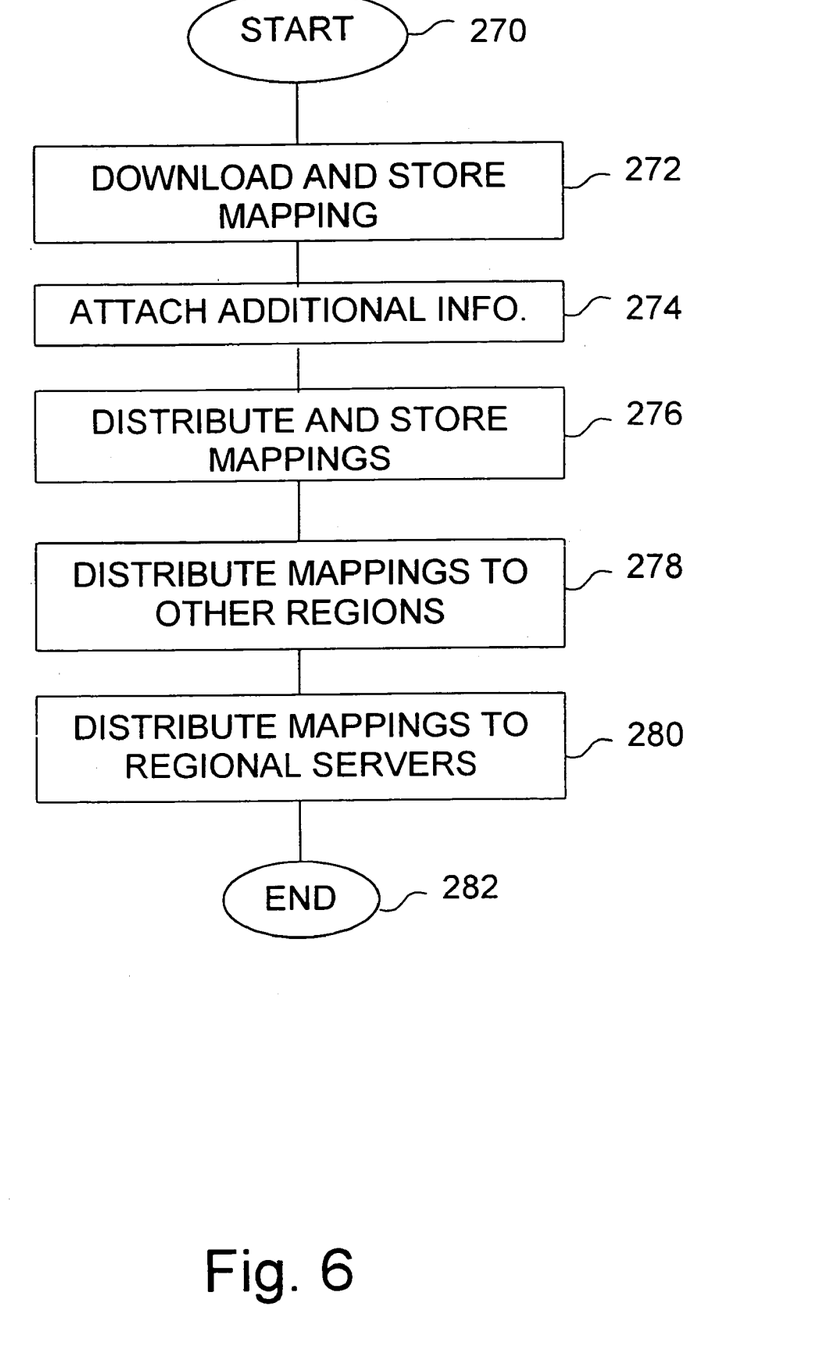
FIG. 6 is a flow chart of a method for handling the situation when said method according to FIG. 4 is performed in several geographical regions.

In FIG. 6 there is disclosed a flow chart of a method for handling the situation when said method according to FIG. 4 is performed in several geographical regions. The method begins at block 270. At block 272 the method continues with the step that said central server 101a downloads mappings between Internet access account information and an identifier from the access means 105a within a first geographic region. The downloaded mapping data is stored in said central storage device 102a. This can be done in real time, as soon as said access means 105a receives updated account information or new accounts, or on a regular basis by day or any other period of time with all new information since the last update. The method continues at block 274 with the step that said supplier server 106a downloads mappings between Internet account information and an identifier from said access means 105a within said first region in the same way as described at block 272. The supplier server 106a distributes the information to the attach means 107a in said first region. The attach means 107a attach additional information to the identification. Said attach means 107a sends the additional information together with the identification to said central server 101a. It is also possible that an attach means 107a receives information from an access means 105a directly, attach additional information and sends this to said central server 101a. The additional information is stored in said central storage device 102a. The next step, at block 276, consists of distributing, with the aid of said central server 101a, said mappings to said regional servers 103a and said mappings are stored in said regional storage device 104a. At block 278 said method continues with the step that said central server 101a distributes said mappings to central servers 101b in other geographic regions if there are service means 108 requesting the information from regional servers 103b or the central server 101b in this other region. The distributed mappings are stored in said central storage device 102b for said other region. The next step, at block 280, consists of distributing, with the aid of said central server 101a, said mappings to regional servers 103b in other geographic regions if there are service means 108 in that region requesting the information from those regional servers 103b. The method is completed at block 282. It is noted that the steps according to this FIG. 6 is a part of the method according to the present invention.

Figure 7:
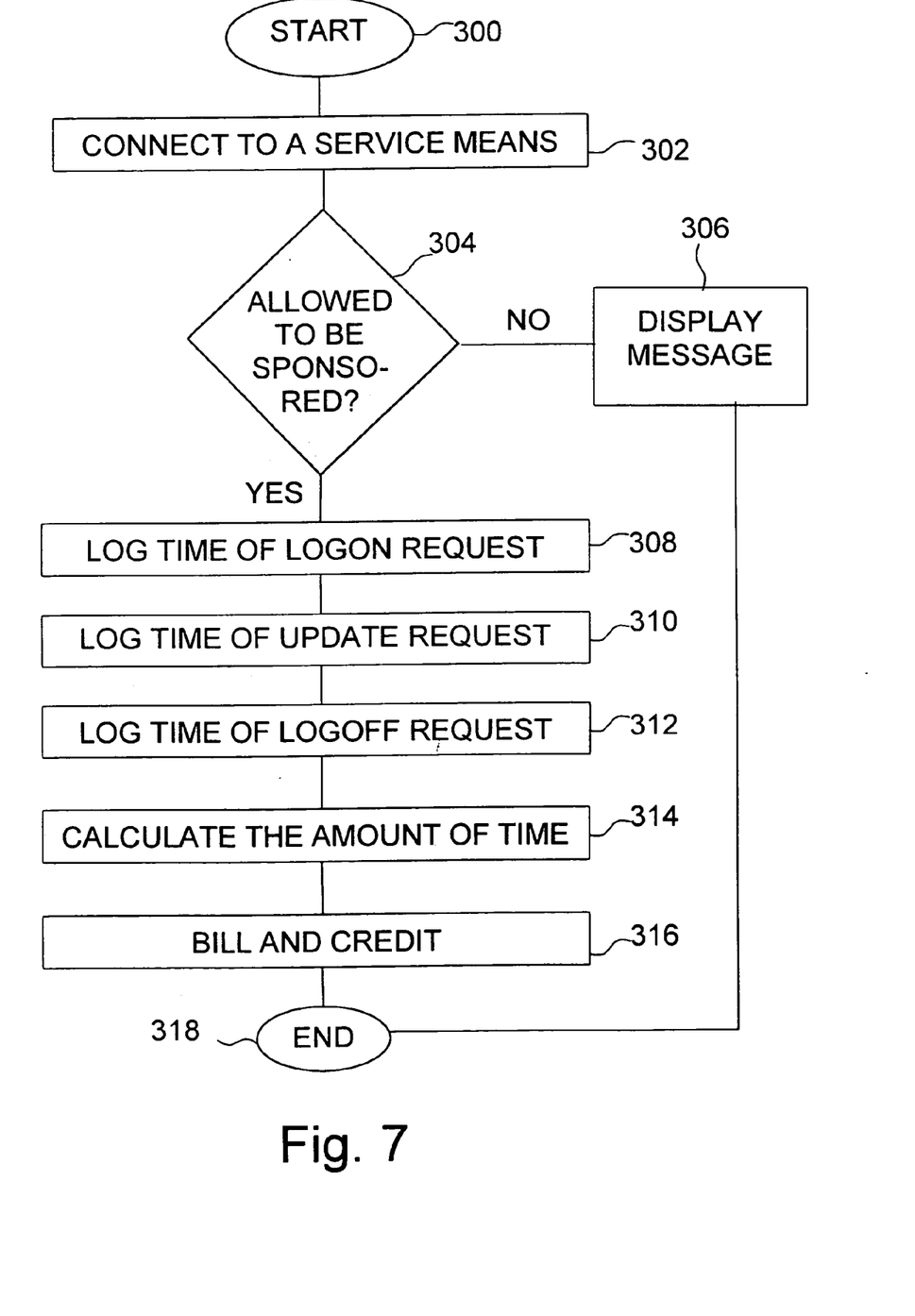
FIG. 7 is a flow chart of a method for performing a service according to the present invention.

In FIG. 7 there is disclosed a flow chart of a method for performing a service according to the present invention. With this service the invention can be used to enable a service means 108 to sponsor Internet users 109 when they visit the service means 108 or use services provided by said service means 108. The method begins at block 300. At block 302 the method continues with the step that an Internet user 109 connects A (see e.g. FIG. 3) to a service means 108. The method continues at block 304 with the step that said service means 108 makes a request, through said first interface unit 110 for a real time identification of said online Internet user 109 to check whether the Internet user 109 is allowed to get sponsoring. If the answer is negative, i.e. if the Internet user 109 not is allowed to be sponsored, the method continues at block 306 with the step that said service means 108 displays a message to the Internet user 109 explaining how the Internet user 109 can get hold of this service. If the answer on the contrary is affirmative, i.e. the Internet user 109 is allowed to be sponsored, the method continues at block 308 with the step that said service means 108 sends a logon request through said first interface unit 110. Said first interface unit 110 redirects the request to a server 101; 103 with an indication of which access means 105a the Internet user 109 is using. The server 101; 103 logs the exact time the logon request was made together with the identification of the Internet user 109, where the identification is derived in the same manner as previously described. At block 310 the method continues with the step that said service device 108 verifies that the Internet user 109 is actively using the services of said service device 108 and sends update requests through the first interface unit 110. Said first interface unit 110 redirects said request to the server 101; 103 which logs the exact time the update request was made together with the identification of the Internet user 109.

The next step, at block 312, consists of the following: said service device 108 notes when the Internet user 109 is not using said services any longer and sends a logoff request through said first interface unit 110. Said first interface unit 110 redirects the request to the server 101; 103, which logs the exact time the logoff request was made together with the identification of the Internet user 109. The method continues, at block 314, with the step that the log, on a regular basis, is parsed to calculate the amount of time a specific Internet user 109 has used a service at a specific service means 108. At block 316 the method continues with the step that said service means 108 will be billed for this time and said access means 105a of the corresponding Internet user 109 will be credited and will reduce the Internet users 109 bill with the corresponding amount. The method is completed at block 318. It is to be noted that the steps according to this FIG. 7 is a part of the method according to the present invention.

In this realization of the invention, information about an Internet user 109 is provided by one or several information suppliers 107a which all have a relationship to the information supplier 105a also being the party providing the Internet access to the Internet user 109. The information provided is compiled and stored in advance in storage (102 or 104) or compiled in real time in cooperation with the Internet access provider 105a. The compiled and stored information is stored in such a way that it is impossible to associate an IP-address with the stored information without the help of an Internet access provider 105a which also is the party distributing the IP-address to the Internet user 109.

When the Internet user 109 implicitly or explicitly requests a service A from a online service provider 108 this online service provider 108 has the possibility to requests part of, or complete information about the Internet user 109 requesting the service. The online service provider 108 will post the request to a device 110 where the device decides where to forward the request. As a result the online service provider 108 receive parts of, or complete information about the Internet user 109 requesting the service.

The retrieved information will be used for controlling parts of, or the complete content of a service provided by the online service provider 108. The retrieved information can also be used to collect statistics about requests to a specific service provided by the online service provider 108.

In this realization of the invention, information about an Internet user 109 is provided by one or several information suppliers 107a which all have a relationship to the information supplier 105a also being the party providing the Internet access to the Internet user 109. The information provided is compiled and stored in advance in storage (102 or 104) or compiled in real time in cooperation with the Internet access provider 105a. The compiled and stored information is stored in such a way that it is impossible to associate an IP-address with the stored information without the help of an Internet access provider 105a which also is the party distributing the IP-address to the Internet user 109.

When the Internet user 109 implicitly or explicitly requests a service A from a online service provider 108 this online service provider 108 has the possibility to request a result from a matching process performed by the server (101 or 103) and request a match with the data retrieved given a specific Internet user 109 requesting a service from the online service provider 108. The online service provider 108 can also specify criteria's to match with within the request for match.

The result of the requested match will be used for controlling parts of, or the complete content of a service provided by the online service provider 108, or more specific, be used to target information or advertisement given the result from the requested match.

The invention will as described so far only be able to identify an individual Internet user 109 defined as being the holder of an Internet subscription. This introduces a problem to identify the physical individual who is actually using the Internet connection N and requesting services A. For example, several members in a family may use one computer, one modem, one telephone line and one Internet subscription for all their Internet usage.

To improve the quality and the possibility to target information in more detail, a small piece of software enables the physical Internet user to select between different profiles (eViduals). These profiles are stored in said storage device 102; 104 in the same way as information in the already described examples. Each said profile has an own identity. The software communicates the currently selected eViduals to the server (101 or 103).

There is also a device (specifically a web-site) enabling physical Internet users to maintain their eVidual profile. This device also enables physical Internet users to select their eVidual regardless of their present location. The facility for physical Internet users to maintain their eVidual profiles permits the QualityAds Network to relay user defined data to online service providers 108 on demand.

On usage of this is that online service providers 108 will be able to personalize content and appearance to suit Internet users 109 based on individual preferences. Another possible use is to provide automated log-in-procedures to services provided by online service providers 108.

Not described in the drawings is the possibility for online service providers 108 to let Internet users 109 interact with servers (101 or 103). This interaction can be used to provide a possibility for an Internet user 109 to give feedback to an action taken by the online service provider given the result m or a request B to server (101 or 103). The feedback from an Internet user 109 is stored in storage (102 or 104) in order to improve the quality of future requests B to server (101 or 103). The feedback can be handled in real time. In this scenario the Internet user 109 acts as an information supplier 107.

Figure 8:
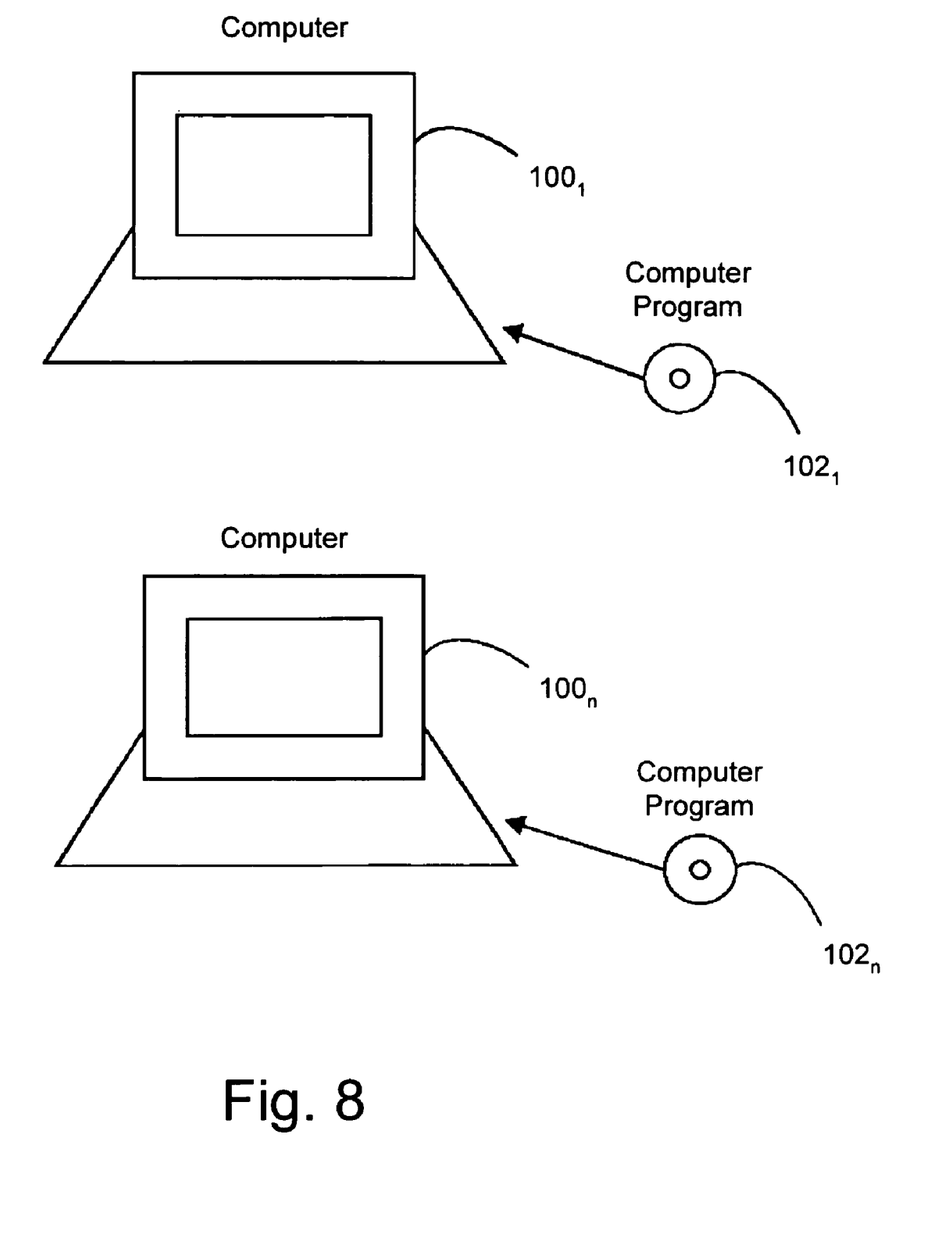
FIG. 8 shows a schematic diagram of some computer program products according to the present invention.

In FIG. 8 there is disclosed a schematic diagram of some computer program products according to the present invention. There is disclosed n different digital computer $100_1, \ldots, 100_n$, wherein n is an integer. There is also disclosed n different computer program products $102_1, \ldots, 102_n$, here showed in the form of compact discs. The different computer program products $1021, \ldots, 102_n$ are directly loadable into the internal memory of the different digital computers 1001, . . . , 100, Each computer program product $102_1, \ldots, 102_n$, comprises software code portions for performing some or all the steps of FIG. 4 when the product(s) 1021, . . . , $102_n$ is/are run on said computer(s) 1001, . . . , $100_n$. Said computer program products 1021, . . . , 102n, can e.g. be in the form of floppy disks, RAM disks, magnetic tapes, opto magnetic disks or any other suitable products.

The invention is not limited to the embodiments described in the foregoing. It will be obvious that many different modifications are possible within the scope of the following claims.

What is claimed is:

1. A system operable to identify and access information about a user (109) of a distributed communication system in real time without the users intervention, wherein the system comprises at least one service device (108) operable to provide services to said user (109), at least one access device (105a) operable to provide access to said distributed communication system, wherein said system also comprises:

at least one control means (101; 103) is connected to said at least one access device (105a) and to said at least one service device (108) via the Internet, wherein said at least one access device (105a) is connected to an identification device (113) operable to identify an address of a specific user;

at least one storage device (102; 104) connected to said at least one control means (101; 103), wherein said at least one control means (101; 103) is connected to a cache means (111) operable to store mappings of said address and identifications of said users (109), wherein said service device (108) sends a request for information about the user requesting a service from said service device (108) to said control means (101; 103), such that the control means (101; 103) checks if said cache means contains an up to date identification; whereby if said check gives an affirmative answer, said control means (101; 103) fetches said information from said storage device (102; 104) and sends a reply comprising said information to said service device (108); and if said check gives a negative answer, said control means (101; 103) sends a request for a real time identification of said address to said, access device (105a), wherein said access device (105a) identifies said address with the aid of said identification device (113) and sends said identification to said control means (101; 103)—such that said control means (101; 103) fetches said information from said storage device (102; 104) and sends a reply comprising said information to said service device (108) that identifies the user, wherein said information about the user is obtained without explicit intervention from the user or from stored data on the user's computer.

2. A system operable to identify and access information about a user (109) of a distributed communication system according to claim 1, wherein said system is divided into a number of geographical regions based on the distance between different geographical regions.

3. A system operable to identify and access information about a user (109) of a distributed communication system according to claim 2, wherein said distance is measured by the delay between individual control means (101; 103) in said system.

4. A system operable to identify and access information about a user (109) of a distributed communication system according to claim 2, wherein each geographical region comprises a central control means (101), a central storage device (102), and in that each geographical region can comprise at least one regional control means (103), at least one regional storage device (104), and at least one access device (105a).

5. A system operable to identify and access information about a user (109) of a distributed communication system according to claim 2, wherein each geographical region also can comprise a supplier means (106a) operable to distribute information, and at least one attach means (107a) operable to attach additional information to identifications, wherein said supplier means (106a) is connected to said at least one access device (105a) and to said at least one attach means (107a).

6. A system operable to identify and access information about a user (109) of a distributed communication system according to claim 1, wherein each service device (108) is connected to a first interface unit (110), which in turn is connected to said-at least one control means (101; 103), in that each control means (101; 103) is connected to a second interface unit (112), which in turn is connected to said at least one access device (105a), and in that each control means (101; 103) also is connected to said at least one storage device (102; 104).

7. A system operable to identify and access information about a user (109) of a distributed communication system according to claim 1, wherein said distributed communication system is the Internet.

8. A system operable to identify and access information about a user (109) of a distributed communication system according to claim 1, wherein each service device (108) is an online service provider (108), each access device (105a) is an Internet access provider (105a), and each control means (101; 103) is a server (101: 103).

9. A system operable to identify and access information about a user (109) of a distributed communication system according to claim 1, wherein each supplier means (106a) is a first supplier server (106a), and each attach means (107a) is a second supplier server (107a).

10. A system operable to identify and access information about a user (109) of a distributed communication system according to claim 1, wherein said address of a user (109) is an IP-address.

11. A method for identifying and accessing information about a user (109) of a distributed communication system in real time without the users intervention, is wherein said method is performed with the aid of a system comprising at least one service device (108) operable to provide services to said user (109), and at least one access device (105a) operable to provide access to said distributed communication system, said method comprises the steps of:
   requesting a service by a user (109) from a service device (108);
   sending a request by said service device (108) for additional information about said user (109) to a control means (101; 103);
   checking, by said control means (101, 103), if a cache means (111) connected to said control means (101; 103) contains an up to date identification; whereby
      if said check gives an affirmative answer, said control means (101; 103) fetches said information from said control means (101; 103) connected to a storage device (102; 104) and sends a reply comprising said information to said service device (108); or
      if said check gives a negative answer, said control means (101, 103) sends a request for a real time identification of an address of said user (109) to said access device (105a);
   identifying said address, by said access device (105a) with the aid of a connected identification device (113), wherein said access device sends said identification to said control means (101; 103) via the Internet; and
   fetching said information from said-storage device (102; 104), and sending a reply comprising said information to said service device (108), wherein said information about the user is obtained without explicit intervention from the user or from stored data on the user's computer.

12. A method for identifying and accessing information about a user (109) of a distributed communication system according to claim 11, wherein said system also comprises a to said each service device (108) connected, first interface unit (110), and a to said each control means (101; 103) connected, second interface unit (112), wherein the method also comprises the following steps:
   forwarding said request sent from said service device (108) by said first interface unit (110), such that the first interface unit (110) decides which control means (101; 103) to send said request to; and
   forwarding said request sent from said control means (101; 103) for a real time identification of an address of said user (109) by said second interface unit (112) which selects the access device (105a) to send said request to.

13. A method for identification and accessing information about a user (109) of a distributed communication system according to claim 12, wherein said interaction is comprised of said user (109) is giving feedback to an action taken by said service device (108), wherein said feedback is stored in said storage device (102; 104).

14. A method for identification and accessing information about a user (109) of a distributed communication system according to claim 11, wherein said system is divided into a number of geographical regions based on the distance between different geographical regions.

15. A method for identification and accessing information about a user (109) of a distributed communication system according to claim 14, wherein said distance is measured by the delay between individual control means (101; 103) in said system.

16. A method for identification and accessing information about a user (109) of a distributed communication system according to claim 14, wherein each geographical region comprises a central control means (101), a central storage device (102), and in that each geographical region can comprise at least one regional control means (103), at least one regional storage device (104), at least one access device (105a), a supplier means (106a) operable to distribute information, and at least one attach means (107a) operable to attach additional information to identifications, wherein said supplier means (106a) is connected to said at least one access device (105a) and to said at least one attach means (107a).

17. A method for identification and accessing information about a user (109) of a distributed communication system according to claim 16, wherein said method also comprises the following steps:
   downloading by said central control means (101), within a first geographical region, mappings between access account information and an identifier from said access device (105a), which mapping data is stored in said central storage device (102) within said first geographical region;
   downloading by said supplier means (106a) within said first geographical region mappings between access account information and an identifier from said access device (105a) within said first geographical region;
   distributing by said supplier means (106a) within said first geographical region said information and identifier to said attach means (107a) in said first region, which attach means (107a) attach additional information to said identifier;
   sending, by said attach means (107a) in said first region, the new total information and identifier to said central control means (101) within said first region; and
   storing said new total information and identifier in said central storage device (102) in said first region.

18. A method for identification and accessing information about a user (109) of a distributed communication system according to claim 17, wherein said method also comprises the steps of:
   distributing, by said central control means (101), said mapping data to said regional control means (103); and
   storing said mapping data in said regional storage device (104).

19. A method for identification and accessing information about a user (109) of a distributed communication system according to claim 16, wherein said method also comprises the steps of:
   distributing, by said central control means (101) in said first region, said mapping data to central control means (101) in another geographical region if there are service devices (108) requesting said information from said regional control means (103) or said central control means (101) in another region than said first region; and storing said mappings data in said central storage device (102) in said another region.

20. A method for identification and accessing information about a user (109) of a distributed communication system according to claim 16, wherein said method also comprises the step of:

distributing, by said central control means (101) in said first regions said mapping data to regional control means (103) in other geographical regions if there are service devices (108) in another region than said first region requesting said information from sad regional control means (103).

21. A method for identification and accessing information about a user (109) of a distributed communication system according to claim 16, wherein said method also comprises the step of:

providing a possibility for said user (109) to interact with said control means (101; 103).

22. A method for identification and accessing information about a user (109) of a distributed communication system according to claim 16, wherein each supplier means (106*a*) is a first supplier server (106*a*), and each attach means (107*a*) is a second supplier server (107*a*).

23. A method for identification and accessing information about a user (109) of a distributed communication system according to claim 16, wherein said address of a user (109) is an IP-address.

24. A method for identification and accessing information about a user (109) of a distributed communication system according to claim 11, wherein said method also comprises the following steps:

updating by said control means (101; 103) said cache means (111) with a mapping between said address and an identification for each said request forwarded by said first interface unit (110);

receiving by said control means (101; 103) a mapping between said address and said identification by querying said access device (105*a*), or directly from another control means (101; 103);

storing by said control means (101; 103) said mapping together with a time stamp in an internal cache means (111); and iterating by said control means (101; 103) through the currently stored mappings between said address and said identification in said cache means (111) if a predetermined time has elapsed since the stored time stamp for said entry; whereby if said address is invalid, which is verified by querying said access device 105*a*, said entry in said internal cache means (111) is removed; or if said address is valid, which is verified by querying said access device 105*a*, said entry is updated with a new time stamp.

25. A method for identification and accessing information about a user (109) of a distributed communication system according to claim 11, wherein said distributed communication system is the Internet.

26. A method for identification and accessing information about a user (109) of a distributed communication system according to claim 11, wherein each service device (108) is an online service provider (108), each access device (105*a*) is an Internet access provider (105*a*), and each control means (101; 103) is a server (101; 103).

27. At least one computer program product (102$_1$, . . . , 102$_n$) directly loadable into the internal memory of at least one digital computer (100$_1$, . . . , 100$_n$), comprising software code portions for performing the steps of claim 11 when said at least one product (102$_1$, . . . , 102$_n$) is/are run on said at least one computer (102$_1$, . . . , 100$_n$).

28. A method of identifying and obtaining information about a computer user that accesses a website or a service on the Internet in a manner that requires no intervention from the user in the form of stored data on the user's computer or log-in procedures, the method comprising the steps of:

requesting a website or a service from the Internet by the computer user;

sending a request for identifying information on the user to a third party entity via the Internet if the website initially cannot determine the user's identity;

retrieving the user's identifying information from a stored database accessible by the third party entity if the identifying information sought is included and updated in the database;

retrieving the user's identifying information, by the third party entity, from an Internet access provider associated with the user's present session if the identifying information sought is not included in the database or is not updated, in which case the access provider associated with the user's present session provides the current identifying information of the user which is used to update the information in the database that is accessible by the third party entity;

sending the identifying information from the third party entity to the website, such that the information about the user is obtained without explicit intervention from the user or from stored data on the user's computer.

29. A method according to claim 28, wherein the computer user, website, and third party entity may be located in different geographical regions.

30. A method according to claim 28, wherein the third party entity checks a cache means for updated information on the user prior to the step of retrieving the user's identifying information from the stored database.

* * * * *